US008498737B2

(12) United States Patent
Yepez

(10) Patent No.: US 8,498,737 B2
(45) Date of Patent: Jul. 30, 2013

(54) COMPACT MEDIA DISC VENDING OR RENTAL KIOSK

(75) Inventor: Rafael Yepez, Duluth, GA (US)

(73) Assignee: NCR Corporation, Duluth, GA (US)

( * ) Notice: Subject to any disclaimer, the term of this patent is extended or adjusted under 35 U.S.C. 154(b) by 237 days.

(21) Appl. No.: 12/908,213

(22) Filed: Oct. 20, 2010

(65) Prior Publication Data

US 2012/0101631 A1 Apr. 26, 2012

(51) Int. Cl.
*G06F 17/00* (2006.01)
*B65H 3/00* (2006.01)

(52) U.S. Cl.
USPC ........... 700/237; 700/231; 700/236; 700/240; 221/191; 221/194; 221/239; 221/255

(58) Field of Classification Search
USPC .............. 221/239, 255, 312 A; 700/236, 237, 700/240, 231, 232
See application file for complete search history.

(56) References Cited

U.S. PATENT DOCUMENTS

| | | | | |
|---|---|---|---|---|
| 4,363,423 | A * | 12/1982 | Larsen | 221/82 |
| 4,997,076 | A * | 3/1991 | Hirschfeld et al. | 194/212 |
| 5,303,844 | A * | 4/1994 | Muehlberger | 221/1 |
| 6,059,142 | A * | 5/2000 | Wittern et al. | 700/238 |
| 7,058,581 | B1 * | 6/2006 | Young | 705/16 |
| 7,287,669 | B2 * | 10/2007 | Takeda | 221/312 A |
| 7,377,402 | B2 * | 5/2008 | Takeda | 221/312 A |
| 7,422,148 | B2 * | 9/2008 | Barton et al. | 235/383 |
| 7,747,346 | B2 | 6/2010 | Lowe et al. | |
| 7,774,233 | B2 * | 8/2010 | Barber et al. | 705/17 |
| 7,860,606 | B2 * | 12/2010 | Rudy | 700/242 |
| 2010/0145507 | A1 | 6/2010 | Blust et al. | |

* cited by examiner

*Primary Examiner* — Timothy Waggoner
(74) *Attorney, Agent, or Firm* — Peter H. Priest; Paul W. Martin

(57) ABSTRACT

A low cost compact kiosk for media disc vending or rental is described. Reduced height and an effective disc drop arrangement allow gravity fed dispensing of media discs simplifying design by eliminating complex robotics requiring trained personnel for maintenance. One such kiosk is approximately 76 cm (30 inches)×58 cm (23 inches)×15 cm (6 inches) and can hold at least 375 standard 1.2 mm thick by 12 cm diameter DVDs.

20 Claims, 9 Drawing Sheets

COMPACT MEDIA DISC VENDING OR RENTAL KIOSK

FIELD OF THE INVENTION

The present invention relates generally to improved methods and apparatus for vending or rental of media discs or the like, and more particularly to advantageous aspects of compact, reduced cost kiosks therefore.

BACKGROUND OF THE INVENTION

Media disc vending or rental kiosks (henceforth collectively "rental kiosks"), such as the Coinstar Redbox™ machines and the Blockbuster Express™ video kiosk made by NCR Corporation, the assignee of the present application, have become ubiquitous with the www.redbox.com web site claiming at least 23,000 locations and a billion rentals as of September 2010. Such kiosks typically offer hundreds of titles which are available to browse through a liquid crystal display (LCD) touch screen. Such browsing can take several minutes resulting in the formation of a line of customers. As a result, the business of customers unwilling to wait may be lost. Furthermore, customers who already know what title they are going to rent or are simply trying to return a disc may have a lengthy wait during a busy period. Similarly, if the returning customer has waited to the very end of the rental period, that customer may end up returning the rental late thereby incurring a late charge if he or she has to wait longer than expected. Such experiences may create an undesirable rental experience.

Other aspects of such big box kiosks are that they are relatively complex to manufacture, assemble and maintain, heavy to ship, and have a substantial footprint requiring a relatively large floor space which can be significant in a retail environment, or any environment in which floor space is at a premium. For example, in markets in many Asian cities, smaller vending machines are highly preferable.

SUMMARY OF THE INVENTION

Among its several aspects, the present invention recognizes that a supplemental or alternative approach may be highly advantageous as addressed further below. According to one aspect of the present invention, a push button activated kiosk dispenses discs utilizing gravity to move a selected disc through a plastic guide member from inventory to a dispense port. A kiosk in accordance with aspects of the present invention may advantageously have a significantly lower production cost than the typical big box solutions addressed above, be simpler and faster to use, require reduced intelligence and processing, utilize no robotics or other complex delivery mechanisms requiring regular service and maintenance, eliminate an expensive touch panel display, employ a low cost and basic central processing unit, may be wall or counter mountable thereby requiring no floor space, and have a compact design which is simple to maintain.

According to one aspect of the invention, a low cost compact kiosk for storing a plurality of media discs and delivering a particular media disc selected by a customer to the customer is provided. The kiosk has a reduced height and employs a compact array of electric motors, each electric motor turning a shaft to advance a media disc to a drop point. The kiosk employs a disc drop guide for guiding the media disc under the influence of gravity from the drop point to a disc outlet for retrieval by the customer.

According to other aspects, the kiosk may deliver media discs which have a thickness of approximately 1.2 mm and a diameter of 12 cm, and the kiosk is housed in a housing having an approximate size of 76 cm (30 inches)×58 cm (23 inches)×15 cm (6 inches). The disc drop guide may be suitably made of molded plastic and have a lower funnel portion with a bottom outlet. The disc drop guide may be readily replaced by an untrained worker as opposed to the trained service person who typically works on robotic delivery mechanisms.

The kiosk may also comprise a pair of rollers aligned with the bottom outlet of the disc drop guide which trap the disc, control movement of the disc to the disc outlet and hold the disc properly positioned at the disc outlet for retrieval by the customer. A sensor positioned to detect passage of the disc while guided by the disc drop guide may also be suitably employed. An RFID reader may also be located to detect passage of the disc, and the read data employed to maintain an inventory of checked out RFID tagged discs.

In one embodiment, the kiosk may further comprise a card reader and a receipt printer. A two line LCD display for displaying simple customer instructions may be advantageously employed to reduce cost. The compact array of electric motors may suitably comprise N electric motors where N is at least twelve, and each of the N electric motors may have a corresponding selection switch.

Further, the kiosk may be advantageously piggybacked with an existing big box kiosk operated in conjunction with a self-service checkout terminal, or a network.

A more complete understanding of the present invention, as well as further features and advantages of the invention, will be apparent from the following Detailed Description and the accompanying drawings.

DETAILED DESCRIPTION

Figure 1:
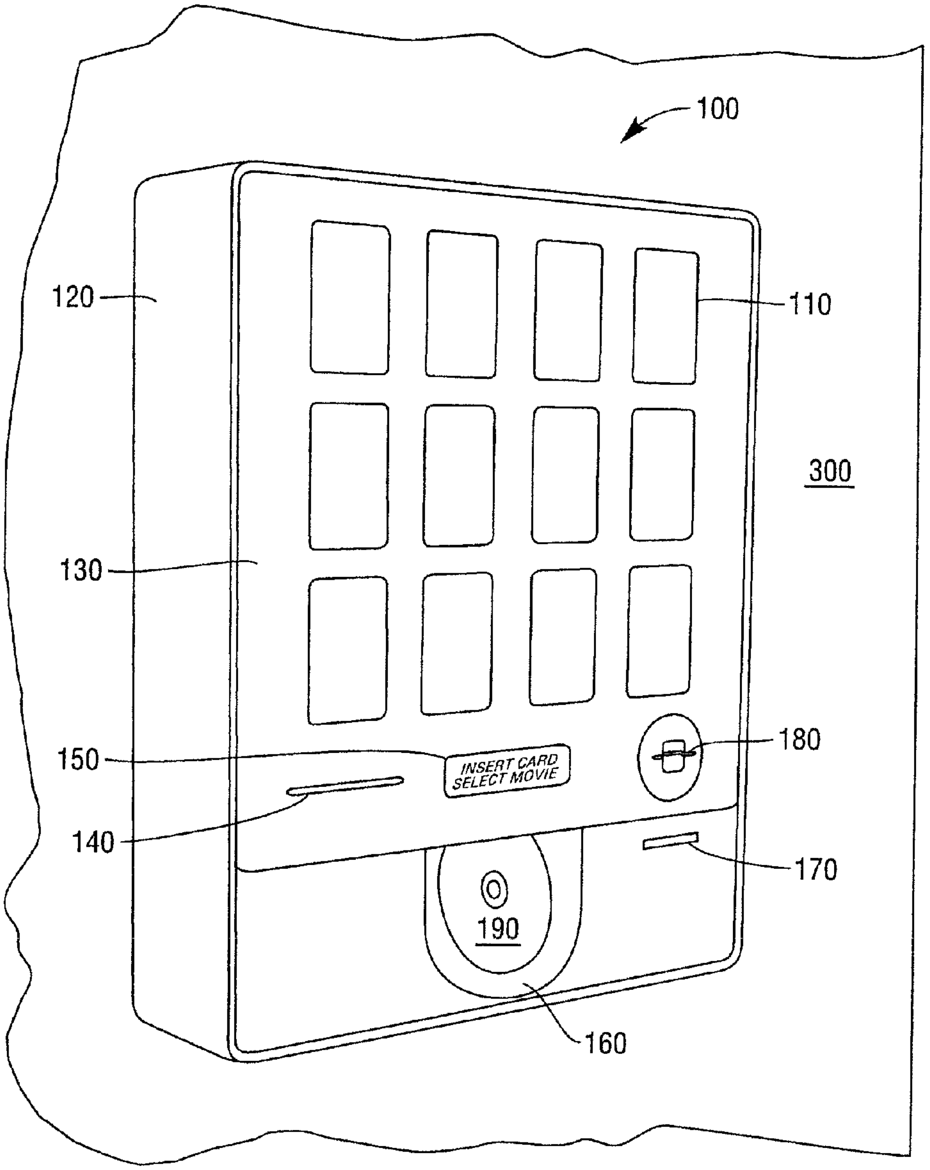
FIG. 1 shows a perspective view of a first embodiment of a wall mounted media disc rental kiosk in accordance with the present invention.

FIG. 1 shows a perspective view of a first embodiment of a media disc rental kiosk 100 in accordance with the present invention. In FIG. 1, kiosk 100 is mounted on a wall 300. Kiosk 100 includes plural media title push buttons 110. In the embodiment of FIG. 1, twelve push buttons or selection switches 110 are shown although it will be recognized a larger or smaller number may be employed for purposes of making a selection of a desired title by a customer. Where the kiosk 100 rents movies on DVDs, each switch may be embodied as a large clear plastic actuator having a product literature insert holder for holding an advertisement for the movie corresponding to the switch. Example dimensions for the kiosk 100 are 30 approximately inches high, 23 inches wide and 6 inches deep for a unit capable of dispensing twelve different titles of DVDs which have a thickness of approximately 1.2 mm as described further herein. With a six inch depth, the kiosk 100 can hold 33 copies of each of twelve titles for a total of 396 discs. With dimensions such as those described herein, kiosk 100 can be mounted low enough on the wall 300 that it is readily accessible to customers in wheel chairs and the like. It is noted that a standard DVD disc weighs about 0.58 oz. so that 400 discs weigh about 15 pounds. With the proper selection of housing material and thickness, as well as other components, a light and highly portable kiosk results.

Kiosk 100 further comprises a sheet metal case 120, a hinged front panel 130, a disc return slot 140, an LCD display 150, a disc output, a receipt dispensing slot 170 for dispensing a customer receipt, and a credit card reader slot 180 for inserting a credit or other payment card to pay for a rental or purchase. An optional slot for dispensing an envelope for holding the disc may also be included if desired. An optional membrane keypad (not shown) for entering a zip code or other input may also be provided.

Figure 2:
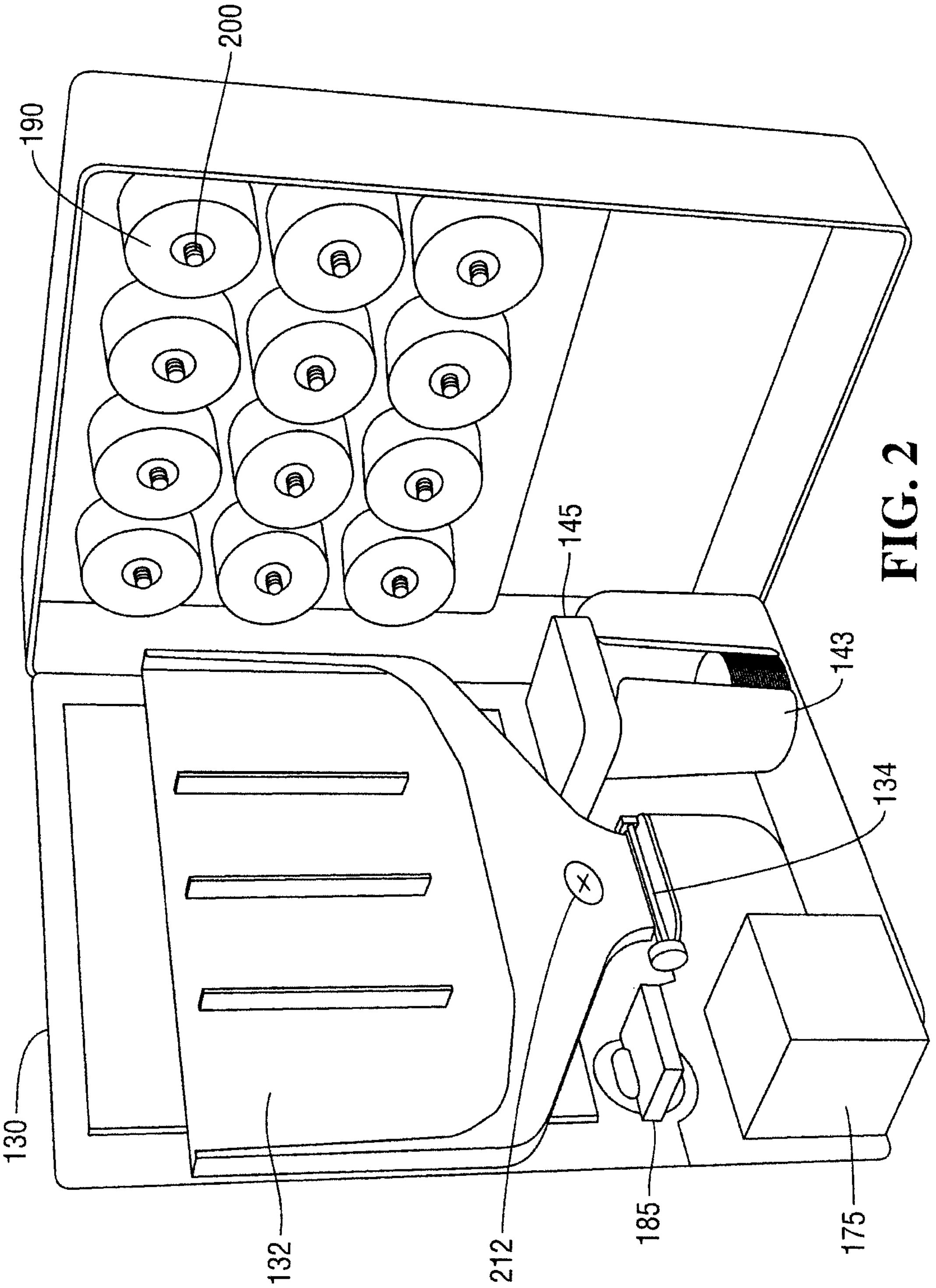
FIG. 2 shows a second perspective view of the media disc rental kiosk of FIG. 1 with a hinged front panel open.

FIG. 2 shows kiosk 100 with the hinged front panel 130 open to illustrate further internal details of the kiosk 100. As seen in FIG. 2, a plastic disc drop guide mechanism 132 is supported by the interior surface of hinged front panel 130 above disc output 160. For ease of maintenance and repair, a simple snap on and snap off mounting arrangement may be employed for guide mechanism 132. As described in further detail below, drop guide mechanism 132 guides the disc selected from the discs 190 on threaded shafts 200 and dropped therefrom in response to selection utilizing a respective one of the pushbuttons 110 by a customer. At the bottom of drop guide mechanism 132, a funnel aligns and feeds the disc into a set of mechanized rollers 134. Rollers 134 slow and trap the dropped disc so it is presented to the customer at the disc output 160 in a similar manner to the rollers in a car CD player. Alternatively, rollers 134 can drop the disc slowly into a drop bin for collection by the customer.

A disc return bin 143 holds returned discs upon return through disc return slot 140. Before returning a disc, the customer again inserts his or her card. As a disc is returned, a reader, such as an RFID tag reader, bar code reader or the like, reads an indicia on the disc such as an RFID tag or bar code. The read is compared with stored information for the rental to insure the correct disc is being returned on time, that the customer is charged accordingly, and the like. From the disc return bin 143, discs can be manually restocked by a service person.

At the end of a transaction, a receipt printer 175 prints a receipt which is delivered to the customer through the receipt slot 170. If desired, at the time of rental, a summary of the item or items selected, the daily rental fee, a return deadline, terms and conditions, or the like may be printed and delivered to the customer.

A credit card reader 185 receives a customer's credit card through slot 180 and reads it for payment.

Figure 3B:
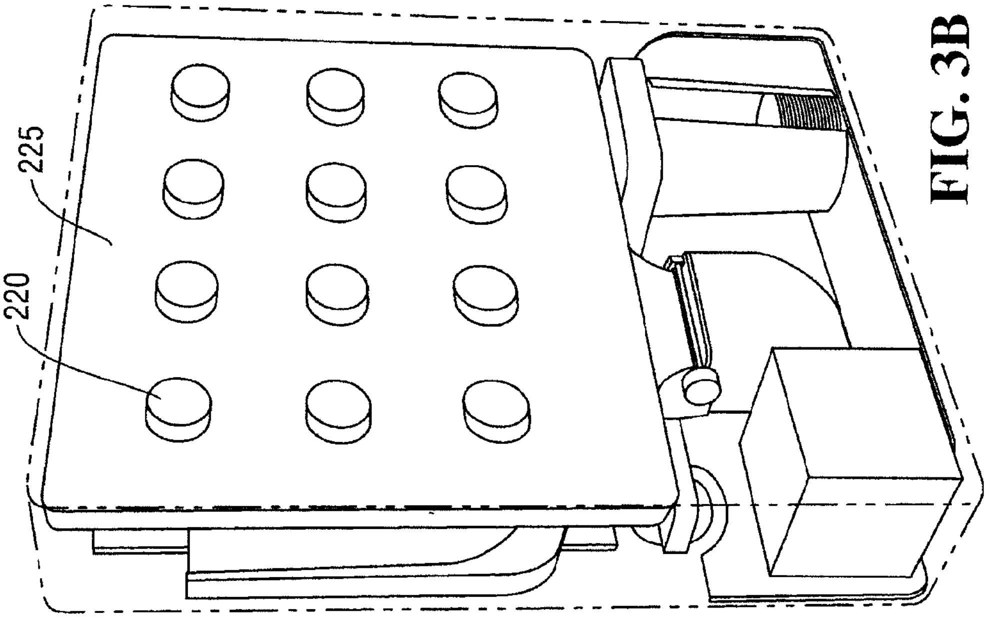
FIGS. 3A and 3B show cutaway side views and a transparent cutaway rear view to illustrate internal details of the media disc rental kiosk of FIG. 1.
Figure 3A:
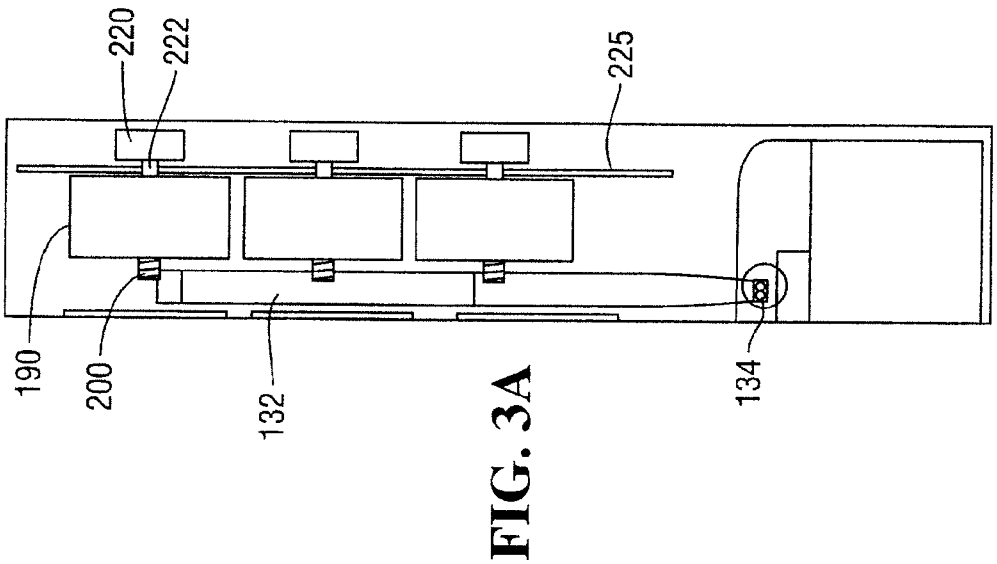

Turning to FIGS. 3A and 3B, further details of the disc drop guide mechanism 132 and electric motors 220 to controllably drive threaded shafts 200 are shown. In the cutaway side view of FIG. 3A, a large number of discs 190 are shown on threaded shafts 200. The shafts 200 are rotatably driven by electric motors 220. When a disc reaches the end of one of the threaded shafts 200, it is guided downwards by the plastic disc drop guide mechanism 132 until it reaches rollers 134 which slowly feed and then hold the disc stopped at the disc output 160 for retrieval by the customer.

The transparent cutaway rear view of FIG. 3B shows a suitable mounting arrangement for twelve electric motors 220. As seen in FIG. 3B, motors 220 are mounted on a mounting and wiring board 225. As seen in FIG. 3A, drive shafts 222 for the motors 220 extend through the mounting board 225 and connect with the disc holding threaded shafts 200.

Figure 4B:
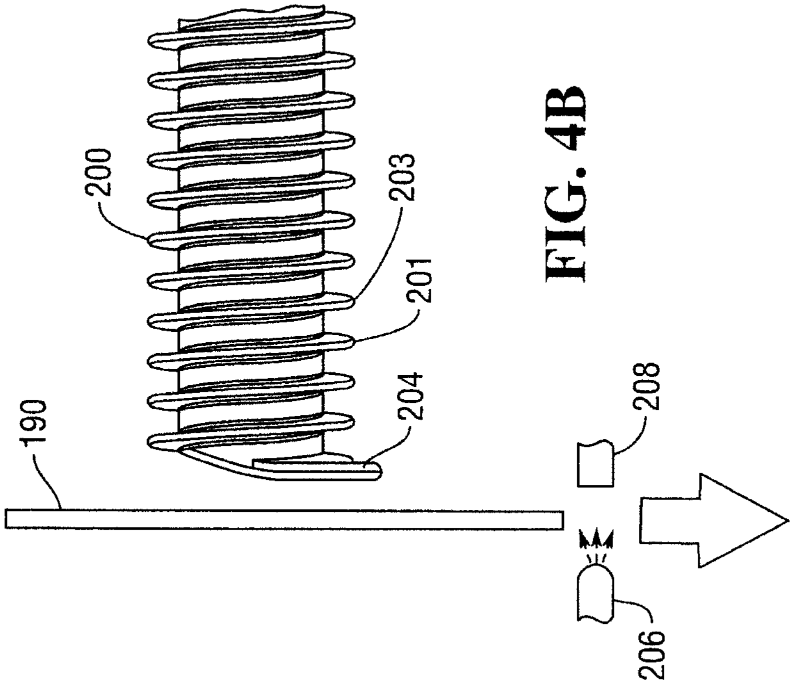
FIGS. 4A and 4B illustrate further aspects of a motor driven threaded disc dropping arrangement according to an aspect of the present invention.
Figure 4A:
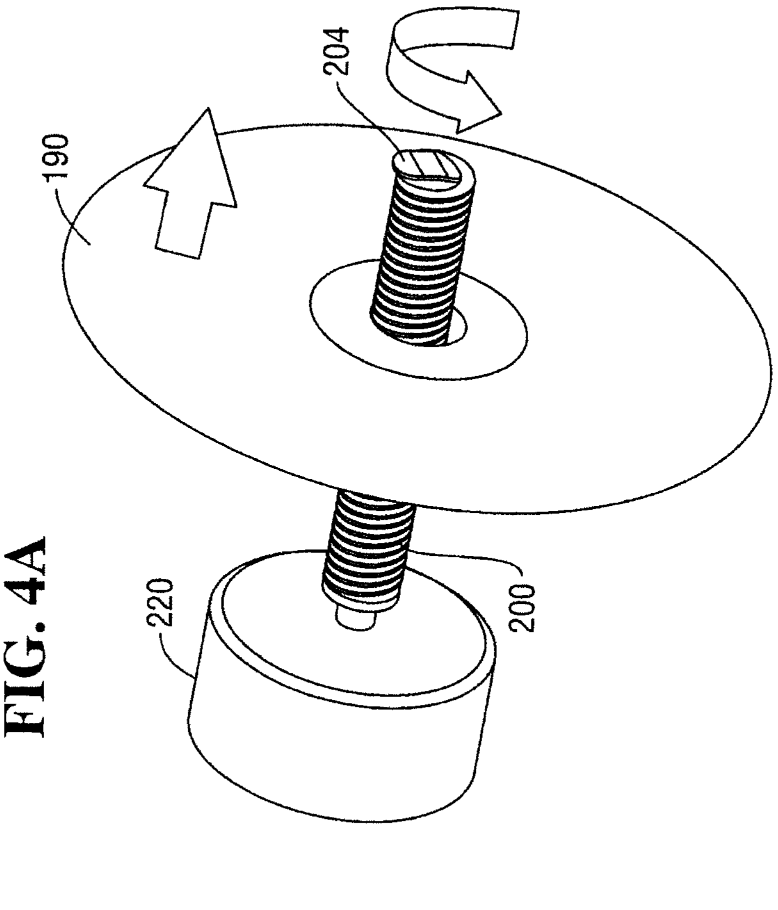
Figure 5B:
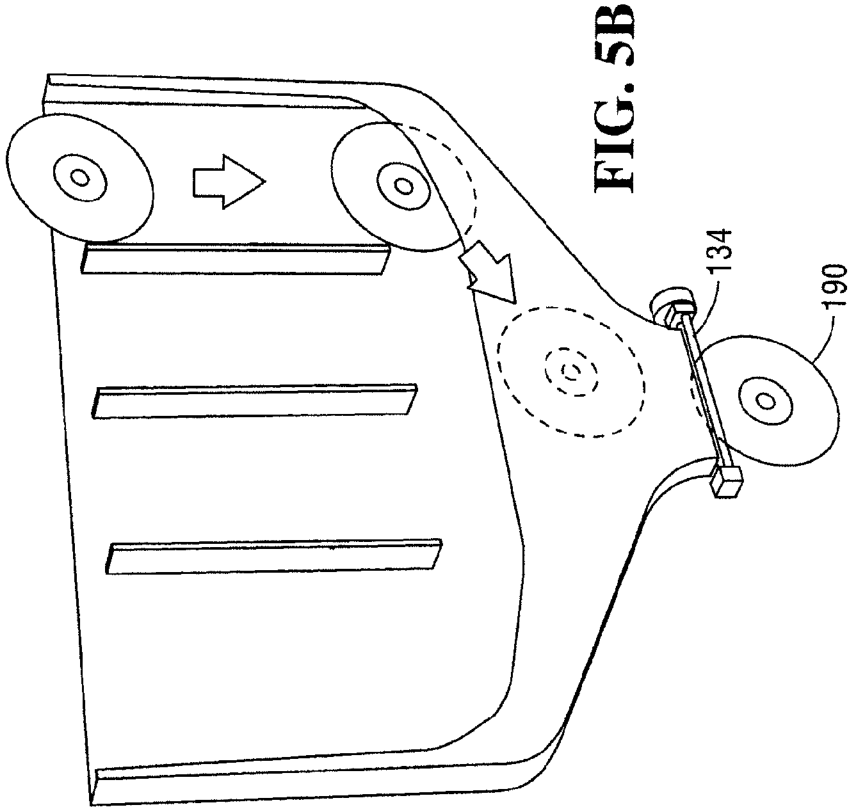
FIGS. 5A and 5B illustrate further aspects of the disc dropping arrangement of FIGS. 4A and 4B.
Figure 5A:
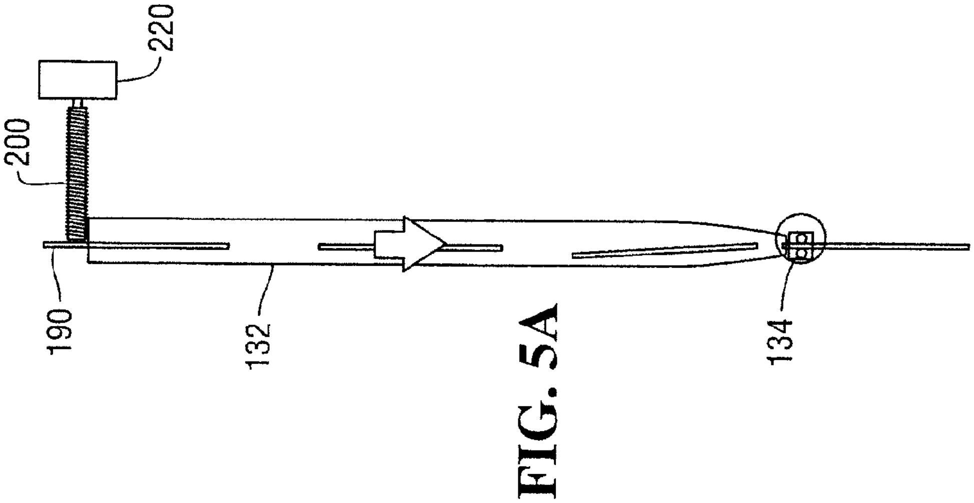

FIGS. 4A, 4B, 5A and 5B illustrate further details of how an individual media disc 190 moves to the end of a threaded shaft 200 and then drops off the end as end member 204 rotates to a downward disc release position as seen in FIG. 4B. A disc drop sensor, such as an optical detector comprising a transmitter 206, such as an LED, and receiver 208, such as a photodetector, may suitably be employed to detect the drop of the disc 190 as the disc 190 blocks transmission of light from the transmitter 206 to the receiver 208. One suitable location for transmitter 206 and receiver 208 is on the front and back walls of back portion 212 of plastic disc drop guide 132 as shown in FIG. 2. Alternatively, a simple spring switch can be placed at position 212 between the front and back walls. As the disc falls, it will close the switch. As a further alternative, transmitter 206 and receiver 208 may be located on the same side of the plastic disc drop guide 132 and angled to reflect from surface of the disc as it passes by. It will be recognized these sensing arrangements are exemplary and others may be employed as desired. As one example, an RFID sensor may be employed for purposes of sensing both disc drop, and in conjunction with the return sensor generating information from which a processor can maintain an accurate inventory of discs in the kiosk 100.

The pitch of individual threads 201 and 203 of threaded shaft 200 are spaced apart more than the thickness of a media disc 190 to be rented by the kiosk 100, but less than the thickness of two such discs. For example, for a standard DVD, the spacing might be 1.4 mm. It will be recognized that by making the threaded shafts readily attachable and detachable from the shafts 222 of motor 220, the kiosk can be adapted for different formats and types of media discs having different thicknesses by simply changing out the shafts 222.

Figure 6:
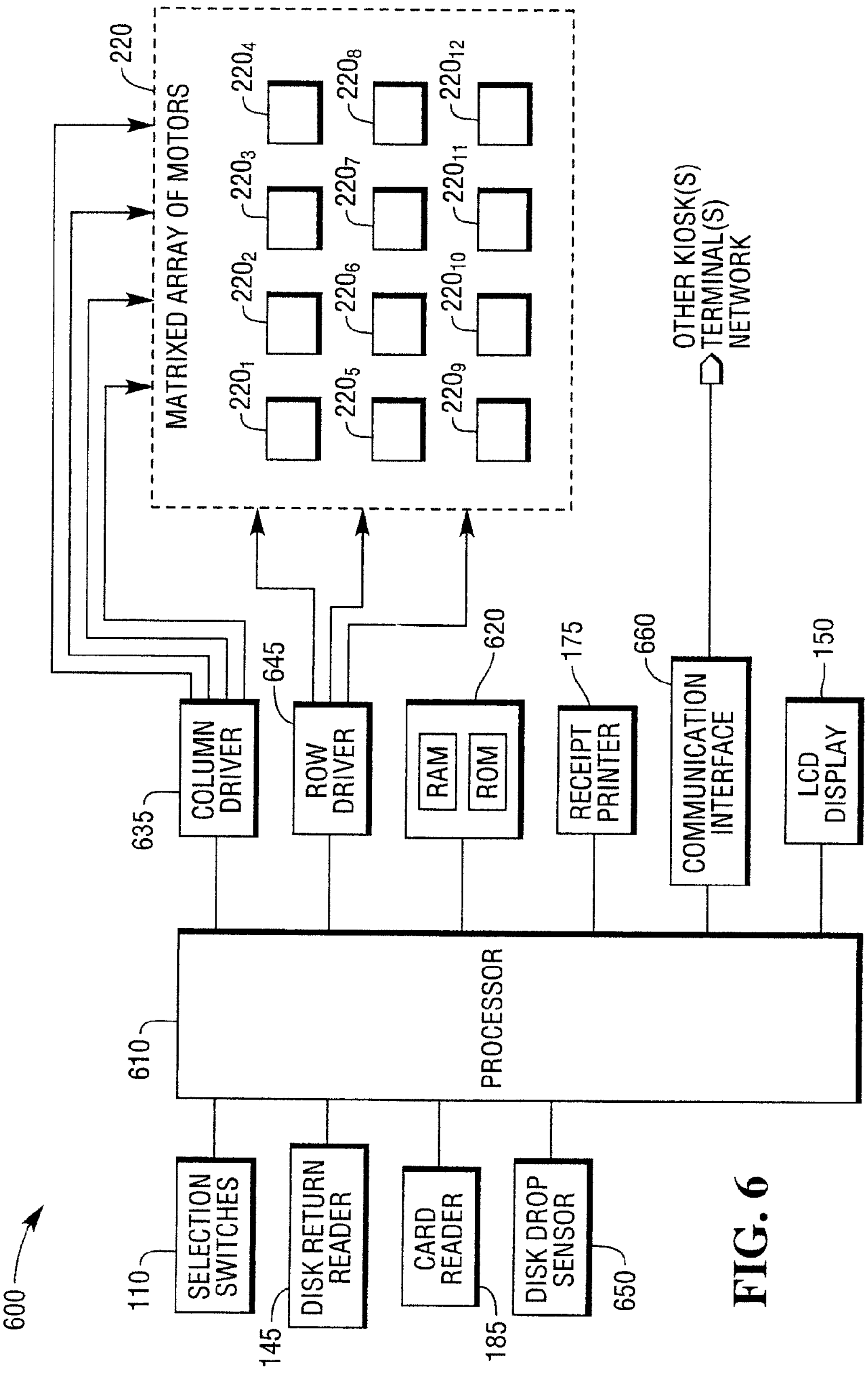
FIG. 6 shows a control circuit for controlling the media disc rental kiosk of FIG. 1.

FIG. 6 shows a control circuit 600 for controlling the media disc rental kiosk 100. In FIG. 6, a suitably programmed processor 610 reviews program instructions and data from, and stores data to a memory 620 including RAM and ROM. Processor 600 receives an input signal indicative of a customer selection as a result of closure of one of the selection switches 110 by a customer to select a movie. The processor 600 also drives the LCD display 150 to provide customer instructions such as "INSERT CARD SELECT MOVIE". In a presently preferred embodiment, display 150 is a low cost two line display for providing simple instructions.

When a customer inserts a credit, debit, movie rental card, or the like into slot 180, card reader 185 reads this card and provides appropriate output to the processor 610. Upon validating the acceptability of the customer's card for payment and its acceptance, processor 610 controls a column driver 630 and a row driver 640 to selectively drive the particular one of the motors $\mathbf{220_1}$-$\mathbf{220_{12}}$ (collectively 220) corresponding to the customer's selector. The selectively driven motor, for example, motor $\mathbf{220_1}$ rotates its threaded shaft until a disc 190 is dropped off the end.

The plastic disc drop guide 132 guides the disc downwards under the influence of gravity. In one embodiment, the guided drop is no more than 24 inches for a DVD having a diameter of 12 cm. Disc drop sensor 650 senses the disc has been dropped and provides an output to processor 610 which turns off the motor $220_1$ so that only one disc drops. Alternatively, motor $220_1$ may be driven for a predetermined time and stopped. If no disc is sensed by disc drop sensor 650 within a predetermined time, the processor 610 tries to drive motor $220_1$ again. If the disc drop is sensed, a record for the customer is stored in the memory and the receipt printer 175 may be driven by the processor 610 to prepare an interim receipt.

Optionally, the processor 610 can also communicate through a communication interface 660 with another kiosk or kiosks, a control network, or with another device such as self-checkout terminal, a checkout terminal, or the like, as discussed further below. At the time of return of the disc 190 by the customer, the customer inserts the disc 190 into the return slot 140. Disc reader 145 reads identifying indicia from the disc 190 provides read data to the process 610, and the processor 610 closes out the transaction. Receipt printer 175 is driven by processor 610 to printout a final receipt which is delivered to the customer through receipt slot 170. In the event of a problem, for example, the customer returns a DVD owned by the customer rather than the previously rented DVD 190, the processor may print information such as "see a customer service person on site", "call a service person" at a number printed on the receipt, "email a service person" or the like.

For a kiosk mounted on the wall of a grocery store, the customer might be instructed to go to the customer service desk where a customer service person could take a key, open hinged front panel 130, investigate, and resolve any problem.

Figure 7:
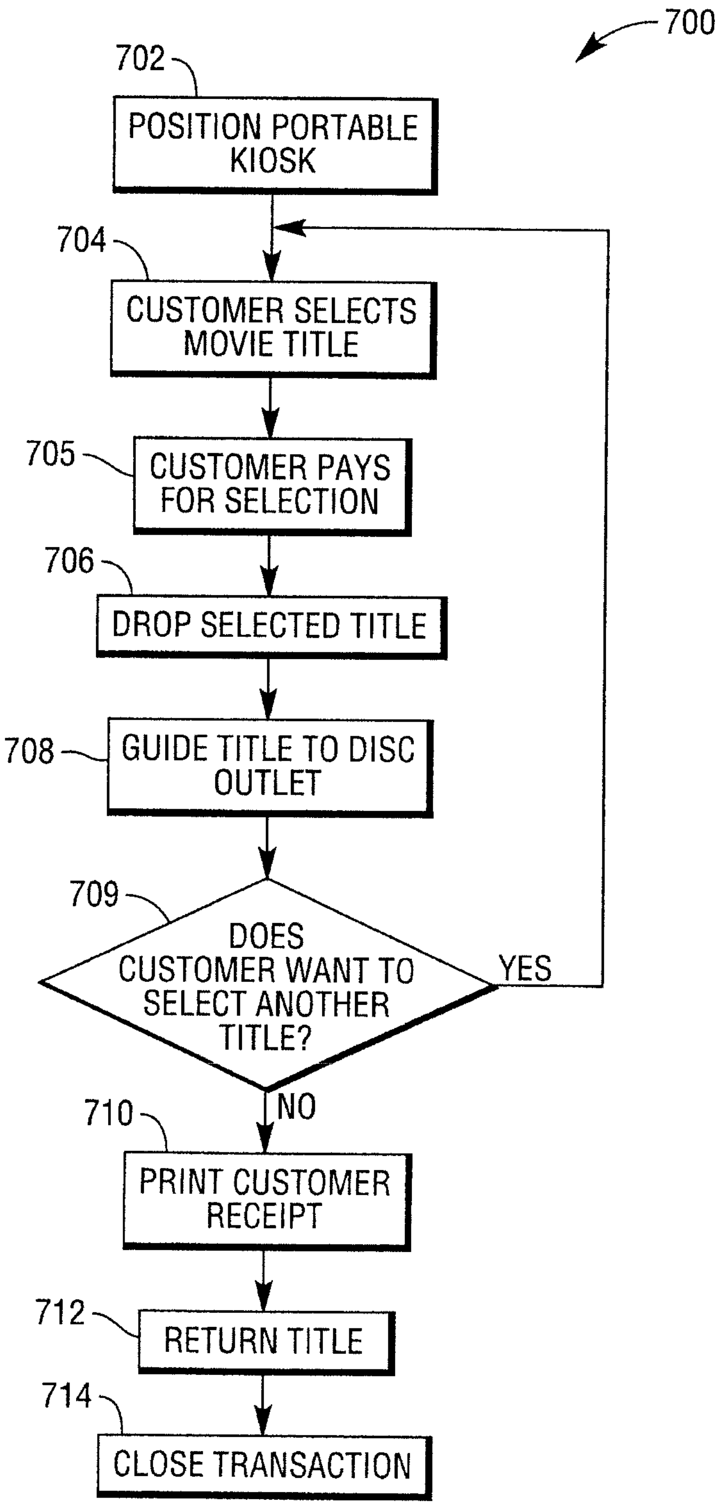
FIG. 7 shows a process of media disc rental kiosk operation in a standalone mode of operation in accordance with the present invention.

FIG. 7 shows a process 700 of media disc rental kiosk operation in a standalone mode of operation in accordance with the present invention. In step 702, a portable kiosk, such as kiosk 100 is positioned. As one example, in a grocery store, two portable kiosks 100 are retrieved from being stored in storage while the store is closed by a customer service person or other store employee and positioned for the day. In one example, it's a nice day and one unit is positioned outdoors on mounting screws which mate with matching cutouts on the back of housing 120. There is also a buy snacks and rent a movie promotion that day at the store, and the second kiosk is mounted or positioned near the snacks involved in the promotion. Alternatively, the portable kiosk or kiosks at a given location may have a permanent location which seldom or never changes. However, the portability of the unit makes such change of location readily possible.

In step 704, a customer approaches the kiosk 100 and makes a selection of a title of a movie for rental or purchase. While the example is for a movie, the selection could be for a videogame, recorded music or some other material suitably distributed as described herein. In step 705, the customer pays for the selection by inserting a card in reader 180, for example.

In step 706, a motor, such as one of the motors 220 is driven to drop the selected title. In step 708, the selected title is guided by a guide mechanism, such as plastic disc drop 132, and travels to a disc outlet, such as output 160, under the influence of gravity. Optionally, as the selected title falls, it is sensed. If in step 709 it is determined the customer wishes to make another selection, process 700 loops back up to step 704. If not, in step 710, a customer receipt is printed and delivered to the customer.

When the customer is done with the title, it is returned in step 712. In step 714, the transaction is closed. As part of this step, a final receipt may be printed for the customer's records.

Figure 8:
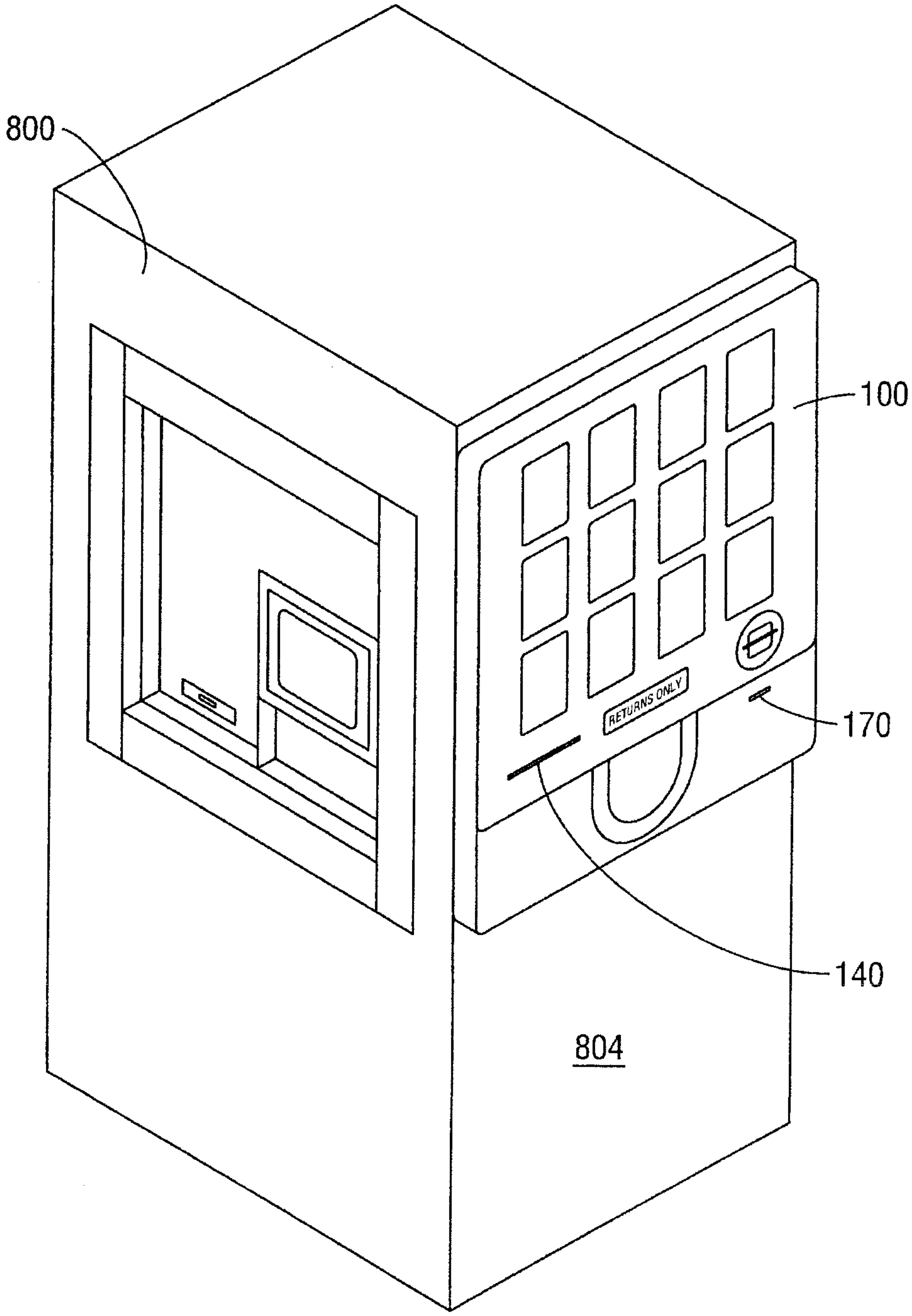
FIG. 8 shows the media disc rental kiosk of FIG. 1 mounted on the side of a big box kiosk.

While FIGS. 1-7 address standalone operation of kiosk 100, the present invention further recognizes that the kiosk 100 can be piggybacked with a big box kiosk 800. Further details of such kiosks are found in U.S. Pat. No. 7,747,346 and U.S. Patent Application Publication No. U.S. 2010/0145507. both of which are incorporated herein by reference in their entirety. As shown in FIG. 8, kiosk 100 is mounted on a sidewall 804 of the big box kiosk 800. One advantageous aspect of such an arrangement is that in periods of heavy returns, the kiosk 100 can be operated in a "RETURNS ONLY" mode with the display 150 shown making such a display in FIG. 8. Thus, instead of waiting in line as a customer reviews movies on kiosk 800, the customer simply wanting to make a return inserts the disc being returned in return slot 140 and receives a receipt from receipt slot 170. As kiosk 100 is designed to be simple and low cost, the receipt may have a barcode to be scanned or code to be entered using the Internet from home, or entered using an entry device for kiosk 800 when the line is gone. So long as the disc is returned on time to kiosk 100 on time, the customer can avoid a late fee. Alternatively, the return interface can be communicated to kiosk 800 using interface 660 if the kiosk 800 is properly programmed for such communication and follow on processing.

During periods of normal operation, kiosk 100 can supplement the hundreds of titles typically stored in kiosk 800 with a ready supply of the most recent and most popular movies that are most in demand for sale or rent. The above examples are exemplary only, and kiosk 100 can be advantageously ganged with kiosk 800 in a wide variety of ways.

While kiosk 100 is shown physically piggybacked with another big box kiosk 800 in FIG. 8, it will be recognized that it could be mounted on a counter top, a checkstand, on a pole or in myriad ways consistent with its relatively small size and weight and wireless communicate therewith. Further, it could be used in conjunction with a self-checkout terminal. A dedicated kiosk 100 for use with a self-checkout terminal having a touch screen, card reader and receipt printer could eliminate such components and utilize the self-checkout components instead. For example, the display of the self-checkout terminal could be employed to ask a customer if he or she wants to rent a movie. If yes, the selection could be made using the touch screen of the self-checkout terminal. Payment could be made using the card reader of the self-checkout terminal and the receipt could be printed with the receipt printer of the self-checkout terminal thereby further reducing the complexity of kiosk 100.

Figure 9:
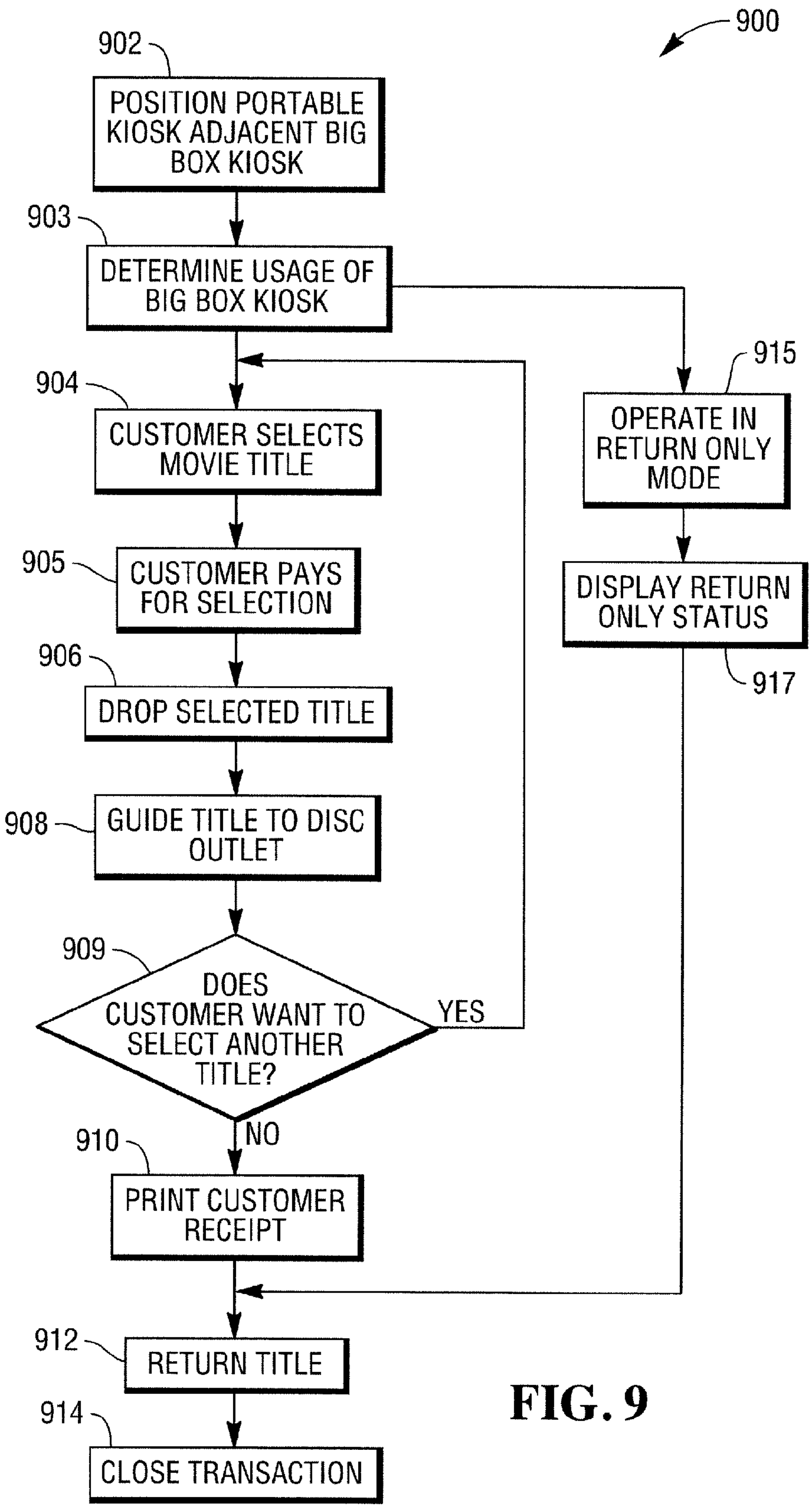
FIG. 9 shows a process of media disc rental kiosk operation in a piggyback mode of operation in accordance with the present invention in which the media disc rental kiosk of FIG. 1 supplements the operation of a big box kiosk.

FIG. 9 shows a process 900 of media disc rental kiosk operation in a piggyback mode of operation in accordance with the present invention. In step 802, a portable kiosk, such as kiosk 100 is positioned adjacent a big box kiosk and communicatively connected therewith. In one embodiment, the portable kiosk is mounted on a sidewalk of the big box kiosk as illustrated in FIG. 8, for example. In step 903, if the big box kiosk is determined to be operating in a period of less than high useage, a customer selects a title from the portable kiosk in step 904, and steps 905, 906, 909, 10, 912 and 914 proceed as for the similarly numbered steps in FIG. 7.

If, however, the useage is heavy in step 903, in step 915, the portable kiosk is operated in a return only mode. In step 917, the return only status is displayed, and the process 900 loops down to step 912 where the customer returns a title. Determination of heavy useage may be based on analysis of prior return data. For example, experience may show that a large number of returns occur as people finish shopping for food for dinner between 5 and 6 PM. The processor of the big box kiosk can be programmed to apply a learning algorithm to learn such patterns. Alternatively or in addition, data from an optical sensor may be utilized to estimate the number of people in front of the big box kiosk. As another exemplary alternative, a store service person can observe a line forming and swipe a control card in the portable kiosk to switch it to the return only mode.

While the present invention has been disclosed in the context of various aspects of presently preferred embodiments, it will be recognized that the invention may be suitably applied to other environments and modified as desired consistent with the claims which follow. For example, while the present invention is disclosed in the context of an embodiment having significantly lower production costs than typical big box solutions, the types of discs, number of motors, dimensions and the like may be readily adjusted as needed to deliver different size discs, more or less total discs, and the like. While an internal mounting has been described as presently preferred, the kiosk may be ruggedized and water proofed for outside mounting if desired. The described kiosk can also be mounted on a stand on a flat surface, a pole attached to a checkout stand or the like.

I claim:

1. A low cost compact kiosk for storing a plurality of media discs and delivering a particular media disc selected by a customer to the customer comprising:

a compact array of electric motors, each electric motor turning a shaft to advance a media disc to a drop point;

a disc drop guide for guiding the media disc under the influence of gravity from the drop point to a disc outlet for retrieval by the customer; and a control processor and a return only mode of operation for periods of heavy return.

2. The kiosk of claim 1 wherein the media discs have a thickness of approximately 1.2 mm and a diameter of approximately 12 cm, and the kiosk further comprises a housing having an approximate size of 76 cm (30 inches)×58 cm (23 inches)×15 cm (6 inches).

3. The kiosk of claim 2 wherein the kiosk holds at least 375 of said media discs for selection.

4. The kiosk of claim 1 wherein the disc drop guide is made of plastic and has a lower funnel portion with a bottom outlet.

5. The kiosk of claim 4 comprising a sensor positioned to detect passage of the disc guided by the disc drop guide.

6. The kiosk of claim 1 further comprising a card reader and a receipt printer.

7. The kiosk of claim 6 further comprising a two line LCD display for displaying short, simple customer instructions.

8. The kiosk of claim 6 wherein the compact array of electric motors comprises N electric motors where N is at least twelve.

9. The kiosk of claim 8 wherein each of the N electric motors has a corresponding selection switch.

10. The kiosk of claim 1 further comprising a communication interface for connection to and communication with a further terminal.

11. The kiosk of claim 10 wherein the further terminal is a big box kiosk.

12. The kiosk of claim 10 wherein the further terminal is part of a self-checkout device.

13. A low cost compact kiosk for storing a plurality of media discs and delivering a particular media disc selected by a customer to the customer comprising:

a compact array of electric motors, each electric motor turning a shaft to advance a media disc to a drop point;

a disc drop guide for guiding the media disc under the influence of gravity from the drop point to a disc outlet for retrieval by the customer wherein the disc drop guide is made of plastic and has a lower funnel portion with a bottom outlet; and a pair of rollers aligned with the bottom outlet which trap the disc, control movement of the disc to the disc outlet, and hold the disc properly positioned at the disc outlet for retrieval by the customer.

14. The kiosk of claim 13 further comprising a control processor and a return only mode of operation for periods of heavy return.

15. A method of utilizing a low cost compact kiosk for storing a plurality of media discs and delivery of a particular media disc selected by a customer to the customer comprising:

advancing a media disc to a drop point utilizing an electric motor turning a shaft, the electric motor being one of a compact array of electric motors;

guiding the media disc under the influence of gravity from the drop point to a disc outlet for retrieval by the customer utilizing a disc drop guide; and utilizing a control processor to operate the kiosk in a return only mode of operation during periods of heavy return.

16. A method of utilizing a low cost compact kiosk for storing a plurality of media discs and delivery of a particular media disc selected by a customer to the customer comprising:

advancing a media disc to a drop point utilizing an electric motor turning a shaft, the electric motor being one of a compact array of electric motors;

guiding the media disc under the influence of gravity from the drop point to a disc outlet for retrieval by the customer utilizing a disc drop guide; and utilizing a pair of rollers aligned with a bottom outlet of the disc drop guide to trap the disc, control movement of the disc to the disc outlet and hold the disc properly positioned at the disc outlet.

17. The method of claim 16 comprising detecting passage of the disc guided by the disc drop guide using a sensor.

18. The method of claim 17 further comprising displaying short, simple customer instructions utilizing a two line LCD display.

19. The method of claim 18 further comprising selecting one of the N electric motors utilizing a corresponding selection switch.

20. A low cost compact kiosk for storing a plurality of media discs and delivering a particular media disc selected by a customer to the customer comprising:

a compact array of electric motors, each electric motor turning a shaft to advance a media disc to a drop point; and a molded plastic disc drop guide for guiding the media disc under the influence of gravity from the drop point, the molded plastic disc drop guide having a funnel portion with a bottom outlet with a width slightly larger than a diameter of the plurality of media discs.

* * * * *